No. 736,527. PATENTED AUG. 18, 1903.
E. G. LATTA.
VELOCIPEDE FRAME.
APPLICATION FILED JAN. 21, 1901.
NO MODEL. 3 SHEETS—SHEET 1.
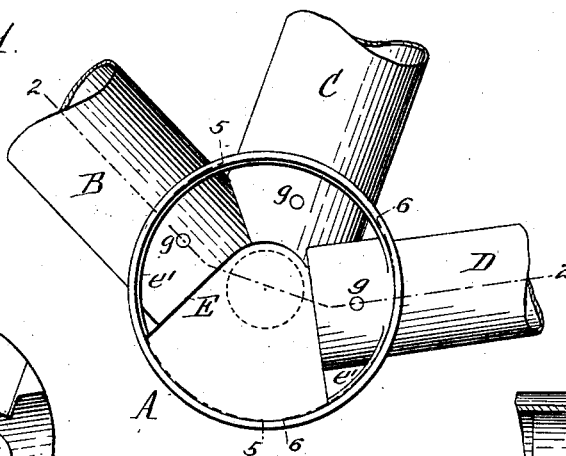
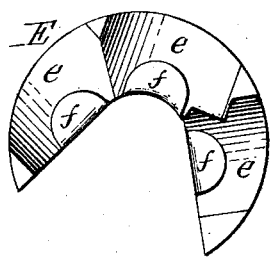
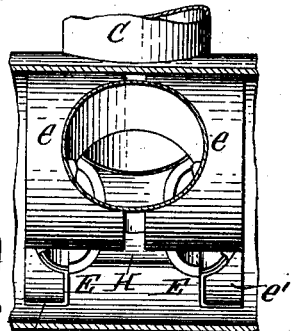
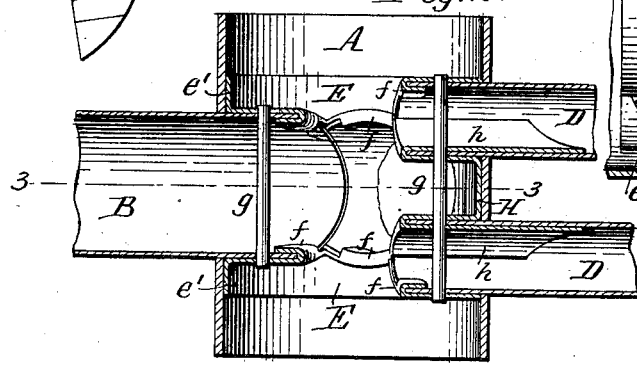
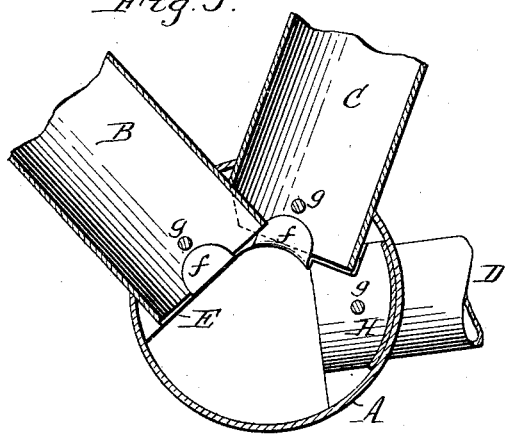
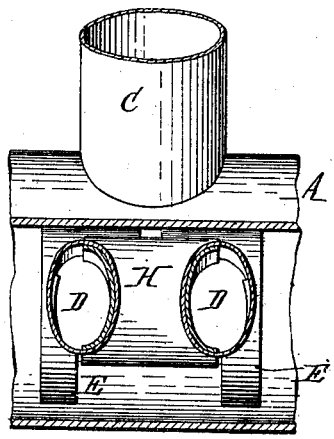
Witnesses:
E. A. Volk.
F. F. Scherzinger.
E. G. Latta, Inventor.
By Wilhelm Bonner
Attorneys.

No. 736,527. PATENTED AUG. 18, 1903.
E. G. LATTA.
VELOCIPEDE FRAME.
APPLICATION FILED JAN. 21, 1901.
NO MODEL. 3 SHEETS—SHEET 2.

Witnesses:
E. A. Volk.
F. F. Scherzinger

E. G. Latta, Inventor
By Wilhelm Bonner
Attorneys.

No. 736,527. PATENTED AUG. 18, 1903.
E. G. LATTA.
VELOCIPEDE FRAME.
APPLICATION FILED JAN. 21, 1901.
NO MODEL. 3 SHEETS—SHEET 3.
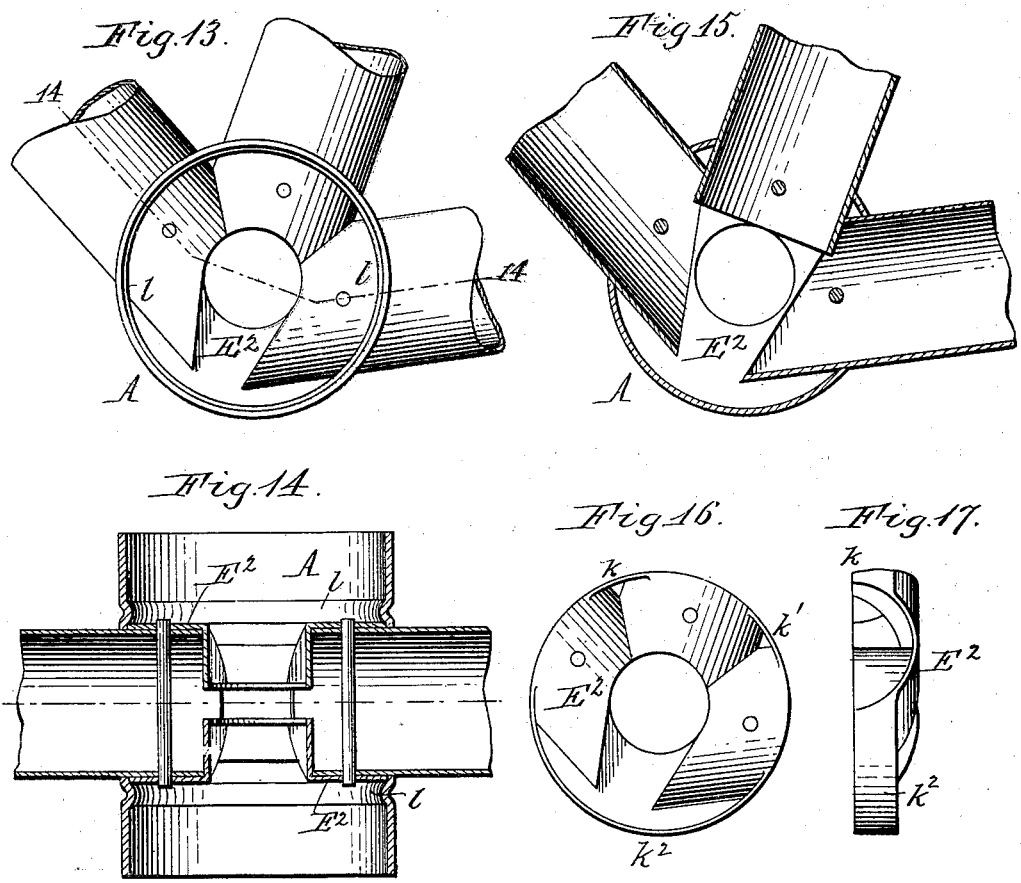
Witnesses:
E. A. Volk.
F. F. Scherzinger.
E. G. Latta Inventor.
By Wilhelm Bonner
Attorneys.

No. 736,527. Patented August 18, 1903.

UNITED STATES PATENT OFFICE.

EMMIT G. LATTA, OF FRIENDSHIP, NEW YORK.

VELOCIPEDE-FRAME.

SPECIFICATION forming part of Letters Patent No. 736,527, dated August 18, 1903.

Application filed January 21, 1901. Serial No. 44,048. (No model.)

*To all whom it may concern:*

Be it known that I, EMMIT G. LATTA, a citizen of the United States, residing at Friendship, in the county of Allegany, in the State of New York, have invented new and useful Improvements in Velocipede-Frames, of which the following is a specification.

The object of my invention is to produce at comparatively small cost a light crank-hanger bracket of small dimension which has a smooth exterior and in which the bracket or connection between the meeting frame members is so combined with the hanger-tube that these parts mutually brace and strengthen each other and form a secure connection between the frame members.

Figure 7:
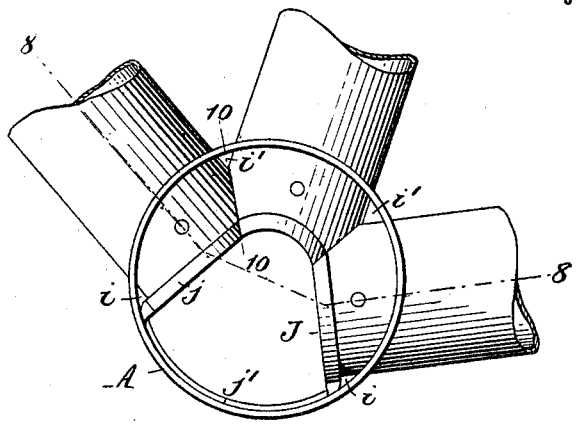
Figure 8:
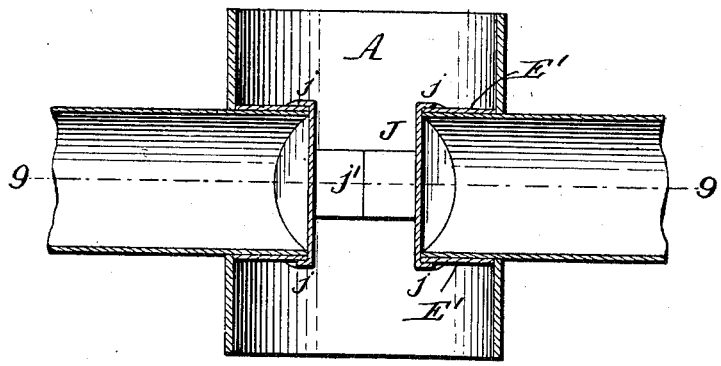
Figure 9:
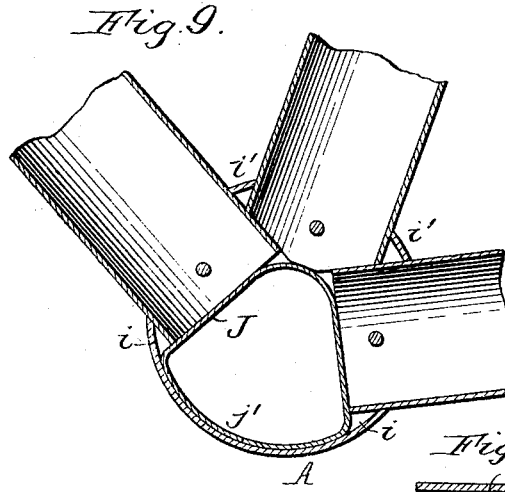
Figure 11:
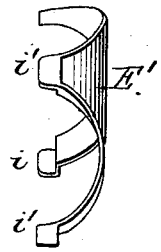
Figure 12:
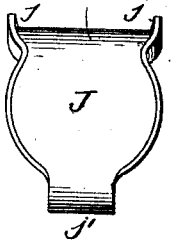
Figure 10:
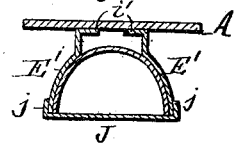

In the accompanying drawings, consisting of three sheets, Figure 1 is a side elevation of the hanger-bracket and the adjoining frame members as applied to a frame of the most approved type. Fig. 2 is a longitudinal section in line 2 2, Fig. 1, looking upward. Fig. 3 is a transverse vertical section in line 3 3, Fig. 2. Fig. 4 is a detached inside view of one of the bracket-plates. Fig. 5 is a vertical section in line 5 5, Fig. 1, looking rearwardly. Fig. 6 is a similar section in line 6 6, Fig. 1, looking forwardly. Fig. 7 is a side elevation of a modified construction of the hanger-bracket. Fig. 8 is a longitudinal section in line 8 8, Fig. 7. Fig. 9 is a transverse vertical section in line 9 9, Fig. 8. Fig. 10 is a fragmentary section in line 10 10, Fig. 7. Fig. 11 is a detached end view of one of the bracket-plates of the hanger shown in Fig. 7. Fig. 12 is a similar view of the clip which connects said bracket-plates. Fig. 13 is a side elevation of another modified construction of the hanger-bracket. Fig. 14 is a longitudinal section in line 14 14, Fig. 13. Fig. 15 is a transverse vertical section in line 15 15, Fig. 14. Fig. 16 is a detached outside view of one of the bracket-plates of the last-mentioned modification. Fig. 17 is an end view thereof.

Like letters of reference refer to like parts in the several figures.

Referring to the construction shown in Figs. 1 to 6, A is the cylindrical hanger-tube; B, the reach member; C, the diagonal frame member, extending upwardly from the hanger-tube, and D the rear-fork members. The latter are preferably of oval cross-section, and all of the other frame-tubes are of circular cross-section. The hanger-tube preferably consists of a piece of seamless tubing which is provided in its side wall with openings through which the various frame members pass into the hanger, the hanger having as many openings as there are frame-tubes and the openings being of such size and form and arranged as may be required by the type and form of the frame to which the hanger is applied. The ends of the radiating frame-tubes are preferably cut off square, and the end of the intermediate tube C is notched or slightly cut away at its front side, as shown by dotted lines in Fig. 3, to permit it to fit over the adjacent end of the reach-tube B. The bracket which connects the meeting ends of the frame members B C D consists in its preferred form of two plates E E of segmental or nearly circular form, which are arranged transversely in the hanger-tube A on opposite sides of said frame members. These bracket-plates are of the proper size to closely fit the inner side of the hanger-tube and are provided in their inner sides with grooves, sockets, or depressions $e$, in which the contiguous sides of the frame members B, C, and D are seated and secured by brazing or otherwise, as most clearly shown in Figs. 2, 5, and 6. By this construction the cavities or depressed portions of the bracket-plates form sockets which partly surround the portions of the meeting frame members within the hanger. If desired, these sockets or depressions may be made of sufficient depth to permit the plates to meet at the center of the hanger; but they preferably embrace only about two-fifths of the circumference of the frame members on each side, so that about four-fifths of the circumference of each frame member is brazed to the two bracket-plates. The central portions of the bracket-plates are cut away for the passage of the crank-shaft, which latter is shown by dotted lines. The outer edges of the plates are brazed to the inner side of the hanger-tube, and in order to increase the area of the brazing-surface at this point the plates are provided with outwardly-turned flanges $e'$, which conform to the inner surface of the hanger-tube and are brazed thereto. These flanges are omitted from the rear portions of the bracket-plates, which rest against the outer sides of the rear-fork tubes D, as shown in Figs. 1 and 2, to permit the usual bearing-cups to abut against the bracket-plates. The flanges $e'$ of the bracket-plates also serve to stiffen these plates and reinforce the hanger-tube where the same is weakened by the apertures for the frame members. $f$ represents inwardly-turned lips arranged at the inner edges of the bracket-plates E and embracing the inner ends of the frame-tubes B, C, and D, thereby holding the bracket-plates in close contact with the tubes in brazing the parts together. These lips also form stops which prevent the frame members from being inserted too far into the hanger. The frame members are held in their seats in the bracket-plates by transverse pins $g$ in the usual manner of brazing such parts. H is a clip or strip of sheet metal which connects the ends of the rear-fork tubes D within the hanger-tube and secures the same to the latter. This clip is brazed to said members, and its central portion is approximately U-shaped and fitted against the inner surface of the hanger-tube and the inner sides of said fork-tubes. The clip is provided with rearwardly-bent branches $h$, which bear against the inner surfaces of the fork-tubes and form internal reinforcements for the same. In assembling the several parts for brazing the clip H is first placed in the hanger-tube A with its branches $h$ projecting through the rear openings thereof. The bracket-plates E are then placed in the hanger-tube from opposite ends thereof and forced inwardly until their sockets or seats $e$ register with the openings of the hanger-tube, after which the several frame-tubes are inserted and driven into their seats until arrested by the stop-lips $f$. The parts are finally pinned and brazed in the customary way. This construction produces an inexpensive and reliable bracket or connection for the frame-tubes, which is concealed within the hanger-tube and which permits the employment of a light, smooth, and comparatively small hanger-tube. The bracket-plates E and the hanger-tube A are so combined that the plates reinforce the hanger-tube, while the latter gives additional support to the frame members and effects a more secure connection of the several adjoining parts than can be obtained with an ordinary hanger of the same weight. The construction of this hanger-bracket is, moreover, adapted to the most approved method of brazing, effecting an important economy in labor in cleaning the frame for enameling. While I prefer to employ two bracket-plates E, applied to opposite sides of the frame-tubes, a single bracket-plate may be employed, if desired.

In Figs. 7, 8, 9, 10, 11, and 12 my hanger-bracket is shown as applied to a three-crown bicycle-frame in which the three frame-tubes that radiate from the hanger are arranged in the same plane. In this modified construction the flanges $e'$ of the first-described construction are omitted and the socketed bracket-plates E' are preferably constructed to nearly meet in the center of the hanger. To afford increased brazing-surface, the end portions $i$ of these plates and the portions $i'$ thereof between the frame members are extended inwardly and fitted against the contiguous inner wall of the hanger-tube, as shown in Fig. 10. Instead of the stop-lips $f$ of the construction previously described an approximately sector-shaped clip J is employed, which bears against the inner edges of the bracket-plates E' and the lower portion of the hanger-tube, as shown in Figs. 7 and 9. This clip is provided at its edges with outwardly-extending flanges $j$, which overlap the inner edges of the bracket-plates, as shown in Figs. 7 and 8, thereby holding these plates against the outer sides of the frame members. The end portions $j'$ of the clip J are reduced in width, as shown in Figs. 8 and 12, and meet in a butt-joint in the lower portion of the hanger-tube. To assemble the parts of this modified hanger-bracket, the clip J is contracted by lapping its narrowed end portions over each other. In this condition the clip is placed in position between the bracket-plates with its flanges $j$ overlapping the plates, and the end portions of the clip are then sprung or spread until their ends abut. The entire bracket can now be passed into the hanger-tube from either end thereof, and after inserting the bracket the frame members are placed in position in the manner hereinbefore described. The clip J serves as a stop for the frame members and also ties the bracket-plates together.

In the modified construction shown in Figs. 13 to 17 the front and rear frame members are arranged at uniform angles to the intermediate frame member. The bracket-plates $E^2$ are alike and interchangeable and consist of centrally-perforated disks which conform to the outer sides of the frame members and bear around their entire periphery against the inner side of the hanger-tube. The bracket-plates are provided at the angles of the frame members with flat or plane portions $k\ k'$, and their lower portions are similarly flattened, as shown at $k^2$. The hanger-tube is provided immediately on the outer sides of the bracket-plates with internal annular beads $l$, which permanently retain the plates in position. These beads are formed in the hanger-tube after properly placing the bracket-plates in the hanger. The ends of the frame members in this modification are cut off, as shown in Fig. 15, the front and rear members being cut obliquely and the intermediate member cut square.

In brazing either of the several forms of my hanger-bracket to the frame members it is only necessary to submerge the bracket in the brazing-crucible sufficiently to cover the hanger-tube, and there is therefore much less spelter to clean off the frame-tubes than is the case where the tubes are joined to the outer side of the hanger. As the bracket-plates are entirely concealed by the hanger, the crank-shaft, and the shaft-bearings, no labor whatever is required upon the bracket after brazing the same. The ends of the pins used in brazing require no attention, and in case one end of a pin is not brazed the defect is not visible, as it would be if the pin were exposed on the outer side of the hanger. The constructions shown in Figs. 1 to 17 are considerably less expensive to manufacture than the hanger-bracket with projecting lugs now in general use, and they are so much more compact that about twice as many can be shipped in a packing-case of a given size.

The hanger and the bracket while rigidly connected and mutually supporting each other are yet independent, so that in case the hanger-tube should break the bracket would still unite the frame members and save the rider from falling. This is an important advantage over the ordinary hanger-bracket, which is built into the frame and allows the frame members to separate in case the hanger-tube becomes broken.

I claim as my invention—

1. A hanger-bracket consisting of a hanger-tube having openings in its side wall for the passage of a plurality of frame members, and a union or bracket plate arranged transversely in said hanger-tube and provided in its side with sockets or depressions which register with the openings in the hanger-tube and brazed to the adjacent end portions of the frame members, and at its outer edge with laterally-extending lips or flanges which are brazed to the inner surface of the hanger-tube, substantially as set forth.

2. The combination with a tubular hanger having openings in its side wall, of frame members extending through said openings into the hanger, bracket-plates arranged transversely in the hanger and provided with sockets or depressions which receive the adjacent end portions of the frame members, and stops arranged to limit the inward movement of said frame members in said socket, substantially as set forth.

3. The combination with a tubular hanger having openings in its side wall, of frame members extending through said openings into the hanger, and bracket-plates arranged transversely in the hanger and provided with sockets or depressions which receive the adjacent end portions of the frame members and stop-lips formed at the inner edge of said bracket-plates against which the adjacent ends of said frame members abut, substantially as set forth.

Witness my hand this 11th day of January, 1901.

EMMIT G. LATTA.

Witnesses:
B. J. RICE,
CHAS. J. RICE.